May 8, 1962
A. J. RUNFT
3,033,043
DIGITAL ACCELEROMETER SYSTEM
Filed March 23, 1960
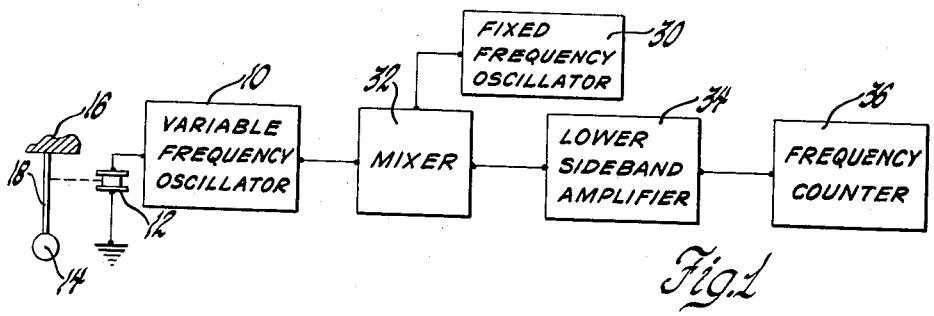
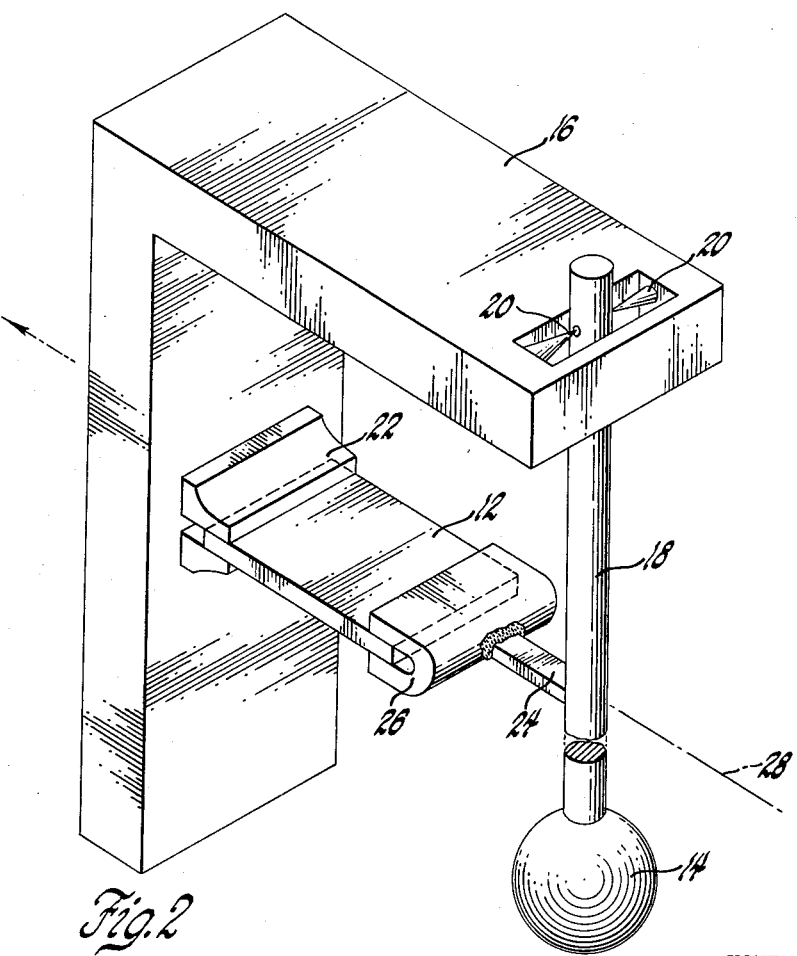
INVENTOR.
Arthur J. Runft
BY
Paul J. Ethington
ATTORNEY

United States Patent Office 3,033,043
Patented May 8, 1962

3,033,043
DIGITAL ACCELEROMETER SYSTEM
Arthur J. Runft, Thiensville, Wis., assignor to General Motors Corporation, Detroit, Mich., a corporation of Delaware
Filed Mar. 23, 1960, Ser. No. 17,190
2 Claims. (Cl. 73—517)

This invention relates to acceleration measurement and more particularly to an accelerometer system of the digital type.

In many applications of accelerometers, particularly in navigation systems, a high degree of precision is required over a wide dynamic range of acceleration values. This is achieved in accordance with this invention by an accelerometer system including means for providing a digital type signal and means for increasing the dynamic ratio of maximum signal to minimum signal. In general, this is accomplished by using a seismic mass to control the frequency of a variable frequency oscillator in accordance with acceleration by means of a force responsive, frequency determining element in the oscillator. In order to increase the dynamic ratio of the acceleration signal, the signal is mixed with a fixed frequency which is preferably of the same value as the frequency of the variable frequency oscillator when the acceleration is zero. The lower sideband or the difference frequency then corresponds with the value of acceleration. A more complete understanding of the invention may be had from the detailed description which follows taken with the accompanying drawings in which:

FIGURE 1 is a block diagram of the digital accelerometer system; and

FIGURE 2 is a perspective view of a transducer for use with the invention.

Referring now to the drawings, there is shown an illustrative embodiment of the invention in an accelerometer system utilizing a piezoelectric crystal transducer. The transducer in this embodiment is adapted to respond to linear accelerations but it will be apparent as the description proceeds that it may be adapted to respond to angular accelerations and that various configurations may be employed, depending upon the particular application of the device. The accelerometer system comprises a variable frequency oscillator 10 including a piezoelectric crystal 12 which constitutes the frequency determining element in the oscillator. The oscillator may be of any desired circuit configuration depending upon the desired frequency range and other operating characteristics. In order to vary the frequency of the oscillator 10 in accordance with acceleration, an inertial or seismic mass 14 is movably mounted upon a support member 16 and is mechanically coupled to the crystal 12. The seismic mass 14 suitably takes the form of a pendulum with a suspension rod 18 suspended by a pair of low-friction pivots 20 in the support member 16. The crystal 12 is mounted on the support member 16 by a crystal clamp 22 and the seismic mass 14 is coupled to the crystal through a link 24 and a crystal clamp 26. The sensitive or input axis 28 of the transducer is perpendicular to the axis of pivots 20 and the axis of the rod 18. In the illustrative embodiment, the crystal 12 is suitably an "AT" cut crystal and is provided with the electrical connections on the flat faces thereof, as indicated in FIGURE 1, and the crystal vibrates in the thickness shear mode. The crystal is oriented between the crystal clamps 22 and 26 so that the mechanical stress is applied along the crystal X-axis to place the crystal in tension. The resonant frequency change of the crystal is linear over a substantial range of tensile stress and, accordingly, the frequency of the oscillator 10 is varied in accordance with the acceleration of the support member 16.

In order to increase the dynamic ratio of the maximum signal frequency to the minimum signal frequency, a reference frequency is subtracted from the variable oscillator frequency to develop a signal frequency corresponding to the deviation due to acceleration. This is accomplished by using a fixed frequency oscillator 30 having a frequency equal to the reference frequency, which is the same as the frequency of the oscillator 10 when the acceleration is zero. The output of the variable frequency oscillator 10 and the output of the fixed frequency oscillator 30 are heterodyned in a mixer 32 and the difference frequency, or lower sideband, is selected and amplified by a frequency selective amplifier 34. The output signal of the amplifier 34 has a frequency corresponding to acceleration and is applied to a frequency measuring circuit 36 which develops an output signal corresponding to the applied frequency and suitably takes the form of a frequency counter or scaler.

In operation, as the support member 16 is subjected to acceleration along the input axis 28 (in the direction indicated by the arrowhead), the seismic mass 14 exerts a force on the crystal 12 and subjects it to tensile stress which causes the frequency of oscillator 10 to increase. With the fixed frequency oscillator 30 tuned to the reference frequency, the mixer 32 develops a lower sideband corresponding to the deviation frequency due to the acceleration. This lower sideband is selected by the frequency selective amplifier 34 and applied to the frequency counter 36 which develops a signal corresponding to the value of acceleration.

The advantages of the heterodyne arrangement will be understood from considering operation of the accelerometer system over an assumed dynamic range of acceleration from $10^{-5}$ to 10 $g$'s. With the variable frequency oscillator tuned to a reference frequency of 9.000000 megacycles and having a maximum frequency of 10.000000 megacycles for 10 $g$'s of acceleration, the frequency of oscillator 10 would vary by only about 10 percent over the entire range of acceleration. However, with the fixed frequency oscillator tuned to 9.000000 megacycles, the lower sideband frequency resulting from the heterodyning of these signals varies from zero to 1,000,000 cycles per second. Thus the dynamic ratio, or signal frequency change, is of the order of 10,000 percent and permits a great increase in the accuracy of acceleration measurement.

Although the description of this invention has been given with respect to a particular embodiment, it is not to be construed in a limiting sense. Numerous variations and modifications within the spirit and scope of the invention will now occur to those skilled in the art. For a definition of the invention, reference is made to the appended claims.

I claim:

1. A digital accelerometer system comprising a fixed frequency oscillator developing an output signal of fixed frequency, a variable frequency oscillator including a piezo-electrical crystal as a frequency determining element and developing an output signal having a frequency corresponding to the magnitude of the tensile force applied to said element defining an input axis of the accelerometer system, support means, a seismic mass mounted on the support means for movement along the input axis and operatively connected with said element to exert a tensile force thereon in accordance with accelerations of said support means along said input axis, the frequency of the variable frequency oscillator being equal to said fixed frequency when the acceleration of the support means is zero, a mixer having one input coupled with the output of the variable frequency oscillator and one input coupled with the output of the fixed frequency oscillator for heterodyning said output signals, frequency selective means coupled with the output of said mixer for passing the lower sideband resulting from the heterodyning of said signals, and a frequency counter connected with the selective means and developing an output signal corresponding to the frequency of the lower sideband as a measure of said acceleration.

2. A digital accelerometer system comprising a fixed frequency oscillator, a variable frequency oscillator including a piezoelectric crystal for determining the operating frequency thereof said crystal being an AT type plate adapted to vibrate in the thickness shear mode, support means, a seismic mass movably mounted on the support means and operatively connected with said crystal to exert a tensile force thereon in accordance with the accelerations of said support means, whereby the frequency of the variable frequency oscillator changes in accordance with the magnitude of the acceleration, the frequency of the variable frequency oscillator being equal to the frequency of the fixed frequency oscillator when the acceleration of the support means is zero, a mixer connected with both of said oscillators, frequency selective means coupled with the mixer for passing the lower sideband from the mixer, and a frequency counter connected with the selective means and developing an output signal corresponding to the frequency of the lower sideband as a measure of said acceleration.

References Cited in the file of this patent
UNITED STATES PATENTS

| | | |
|---|---|---|
| 1,902,184 | Rieber | Mar. 21, 1933 |
| 1,975,516 | Nicolson | Oct. 2, 1934 |
| 2,319,940 | Marrison | May 25, 1943 |
| 2,371,626 | Kecskemeti | Mar. 20, 1945 |
| 2,728,868 | Peterson | Dec. 27, 1955 |
| 2,841,386 | Everett | July 1, 1958 |

UNITED STATES PATENT OFFICE
CERTIFICATE OF CORRECTION

Patent No. 3,033,043                                                      May 8, 1962

Arthur J. Runft

It is hereby certified that error appears in the above numbered patent requiring correction and that the said Letters Patent should read as corrected below.

Column 2, line 64, strike out ", support means" and insert the same after "element" in line 63, same column 2.

Signed and sealed this 4th day of September 1962.

(SEAL)
Attest:

ERNEST W. SWIDER                                            DAVID L. LADD
Attesting Officer                                                    Commissioner of Patents